3,397,211
PROCESS FOR PREPARING 3-INDOLYL
ACETIC ACIDS
George Gal, Summit, N.J., assignor to Merck & Co., Inc.,
Rahway, N.J., a corporation of New Jersey
No Drawing. Filed Sept. 9, 1966, Ser. No. 578,159
3 Claims. (Cl. 260—326.13)

ABSTRACT OF THE DISCLOSURE

A process for preparing 3-indolyl acetic acids, by acylating an amino cinnamic acid, followed by reaction with acetaldehyde to form the desired product. The products are useful as anti-inflammatory agents.

---

This invention relates to a process for preparing 1-p-chlorobenzoyl - 2 - methyl-5-methoxy-(or dimethylamino)-3-indolyl acetic acids.

The indole compounds of this invention have a high degree of anti-inflammatory activity and are useful in the treatment of arthritis and like conditions, which are responsive to treatment with anti-inflammatory agents.

In the past these compounds have been prepared by acylation of an α-3-indolyl acetic acid ester by reaction with a strong base, such as sodium hydride, to form an N-1-sodium salt, followed by reaction with an aryl halide. Under the conditions of acylation, the acid side-chain required protection to avoid acylation of the acid side-chain also. To afford this protection, the 3-indolyl acetic acid was esterified prior to acylation. After acylation, the desired acid compound was formed by diesterification of the corresponding ester.

We have found a novel process for preparing the above-mentioned 3-indolyl acetic acids which comprises acylating a 2-amino-5-substituted cinnamic acid to form the corresponding 2-benzamido compound, and either reacting this compound with acetaldehyde in the presence of a strong acid to yield directly the desired 3-indolyl acetic acid compound, or alternatively stepwise reacting the benzamido compound with acetaldehyde in a weak acid to form first the N-α-hydroxyethyl benzamido compound and subsequently, cyclizing in the presence of a strong acid to form the desired 3-indolyl acetic acid compound. This process has several advantages over the previously-known process in that the acylation step is carried out on a primary amino group and, therefore, there is no need to use a strong base, such as sodium hydride, to activate the nitrogen; further, the acylation may be carried out directly without prior protection of the acid side-chain.

The process of this invention may be carried out in several ways, that is, the process may be run such that distinct intermediate products are obtained, (see Flow Sheet I) or reaction conditions may be used such that the process may be carried out in one step without isolating or stopping at each of the intermediate steps. For example, the starting 2-amino-5-methoxy-(or dimethylamino) cinnamic acid may be acylated under Shotten-Bauman conditions to obtain the 2-(p-chlorobenzamido)-5-methoxy-(or dimethylamino) cinnamic acid. This compound may be reacted to form directly the 1-p-chlorobenzoyl-2-methyl-5-methoxy-(or dimethylamino)-3-indolyl acetic acid or may be reacted such that each of the intermediate comounds are separately formed.

The alternative procedures may be described as follows: The p-chlorobenzamido cinnamic acid compound (Flow Sheet I, Compound II) may be condensed with acetaldehyde in the presence of a weak organic acid such as acetic acid, to form the N-α-hydroxyethyl [2(p - chlorobenzamido) - 5 - methoxy - (or dimethylamino)] cinnamic acid (Flow Sheet I, Compound III) which compound may then be reacted in the presence of a strong acid, such as phosphoric acid, to yield directly the desired indole compound (Flow Sheet I, Compound V) or may be reacted in a strong acid, such as phosphoric acid at lower temperatures (i.e., —40° to —20° C.) to first form the intermediate 3-indolinylidine compound (Flow Sheet I, Compound IV) which may then be heated in a strong acid to form the desired indole compound. Alternatively, the p-chlorobenzamido cinnamic acid compound may be condensed with acetaldehyde in the presence of a strong acid, such as phosphoric acid, at any suitable temperature and subsequently heated (if the condensation reaction has been carried out at low temperature) to form directly the desired indole compound.

The starting 2-amino-5-dimethylamino cinnamic acid compound may be prepared by reacting 2-chloro-5-nitro benzaldehyde in ethanolic HCl to form the corresponding acetal, which compound is then reacted with ammonia to form the corresponding 2-amino-acetal compound. This compound is then acylated to protect the 2-amino group and reductively alkylated to form the corresponding 5-dimethylamino compound. After removal of the protecting groups by acid hydrolysis, the compound is then converted to the corresponding acylated cinnamic acid compound by the Perkin reaction, and subsequently hydrolyzed to form the desired starting material.

The process of this invention may be described more fully by the following flow sheet, and reaction conditions:

FLOW SHEET I

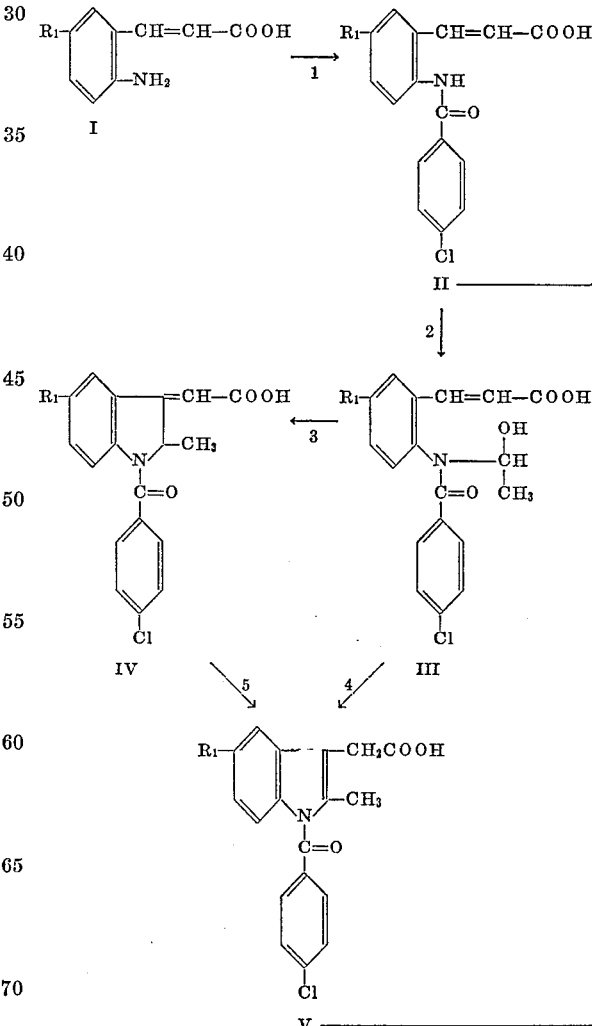

$R_1$ may be methoxy or dimethylamino

Step 1.—Acylation with a p-chlorobenzoyl halide or anhydride preferably p-chlorobenzoyl chloride with a water-soluble base (such as an alkaline or an alkaline earth hydroxide).

Step 2.—Reaction with acetaldehyde in an inert solvent, (such as benzene, toluene, ethers, and the like) in the presence of a weak organic acid, (such as acetic acid, propionic acid, maleic acid, and the like) at any suitable temperature, (room temperature to boiling point of solvent or reactant, preferably 50–70° C.).

Step 3.—Reaction in organic solvents (such as toluene, xylene or lower alkanols) at lower temperatures, such as −40° to −20° C., in a strong acid, (such as methanesulfonic acid, p-toluenesulfonic acid, phosphoric acid, and the like).

Step 4.—Reaction in an inert organic solvent (such as benzene, toluene, xylene, acetic acid and the like) at from room temperature to the boiling point of the solvent, preferably 50–70° C., in a strong acid, such as p-toluenesulfonic acid, methanesulfonic acid, phosphoric acid, and the like.

Step 5.—Same as Step 4.

Step 6.—Reaction with acetaldehyde in an inert solvent (such as benzene, toluene, ethers, and the like) at any suitable temperature, preferably at room temperature to the boiling point of the solvent, especially room temperature in the presence of a strong acid (such as p-toluene sulfonic acid, methane sulfonic acid, phosphoric acid, and the like) and subsequently after the condensation, heating the reaction mixture, preferably to temperatures of 50–70° C.

It is to be emphasized that the condensation of the cinnamic acid compound (Step 2) with acetaldehyde, and the cyclization to form directly the indole compound may be carried out by using a strong acid at elevated temperatures, whereas, if the intermediate N-α-hydroxyethyl cinnamic acid compound (Step 2) and the 3-indolinylidene compound (Step 3) are desired as distinct products, the condensation of the cinnamic acid compound is carried out with a weak acid to form the condensation product (N-α-hydroxyethyl cinnamic acid compound), which is subsequently reacted with a strong acid at low temperatures to form the 3-indolinylidene compound (Step 3) or in a strong acid at higher temperatures to form the indole compound (Step 4). Varying the temperature and the strength of the acid in any of the previously described steps will tend to yield mixtures of the various intermediates and final compound. Therefore, when it is desired to obtain the indole compound directly or each of the intermediate compounds successively, it is preferred to use very strong or weak acids at high or low temperatures, depending upon the product desired.

The following examples are used to illustrate the invention.

Example 1.—2-(p-chlorobenzamido)-5-methoxycinnamic acid 2-amino-5-methoxycinnamic acid (S. N. Chakravarti, J. Ind. Chem. Soc. 14, 463 (1937) (19p) is dissolved in 25 ml. of 12 N sodium hydroxide. p-Chlorobenzoylchloride (18 ml.) is added with vigorous stirring over 20 minutes maintaining the temperature between 30–40° C. by external cooling. When the p-chlorobenzoylchloride is completely reacted, the mixture is cooled to 10° C. and acidified with 5 N hydrochloric acid. The precipitate is filtered, washed with water and dried in vacuo, after which it is slurried in 150 ml. of chloroform. The insoluble p-chlorobenzoic acid is filtered and the filtrate concentrated in vacuo to give 2-(p-chlorobenzamido)-5-methoxycinnamic acid.

Similarly, when 2 - amino - 5-dimethylaminocinnamic acid is used in place of 2-amino-5-methoxycinnamic acid in the above example there is obtained 2-(p-chlorobenzamido)-5-dimethylaminocinnamic acid.

Example 2.—N-α-hydroxyethyl-[2-(p-chlorobenzamido)-5-methoxy]-cinnamic acid

To a solution of 33.2 g. of 2-(p-chlorobenzamido)-5-methoxycinnamic acid in 100 ml. of glacial acetic acid is added 5.0 g. of freshly distilled acetaldehyde. The reaction mixture is heated to 60–70° C. for 2 hours. The solvent is removed in vacuo to give N-α-hydroxyethyl-[2-(p-chlorobenzamido) - 5 - methoxy] - cinnamic acid (Compound III).

Similarly, when the 5-dimethylamino compound obtained from Example 1 is used in place of 2-(p-chlorobenzamido)-5-methoxycinnamic acid in the above example there is obtained the corresponding α-2-hydroxyethyl-5-dimethyl amino compound.

Example 3.—1-p-chlorobenzoyl-2-methyl-5-methoxy-3-indolinylidene-acetic acid

To a solution of 100 mg. of p-toluenesulfonic acid in 100 ml. of ether is added 5 g. of N-α-hydroxy-ethyl-[2-(p-chlorobenzamido)-5-methoxy]-cinnamic acid portionwise at −20° C. The reaction mixture is aged for 12 hours at the same temperature, then poured with good stirring into 100 ml. of water containing 1 g. of sodium acetate. The ether phase is separated, washed with 20 ml. of 1% sodium acetate solution, then with water, dried over $MgSO_4$ and concentrated in vacuo to give 1-p-chlorobenzoyl-2-methyl-5-methoxy-3 - indolinylidene acetic acid.

Similarly, when the N-α-hydroxyethyl-5-dimethylamino compound obtained from Example 2 is used in place of N - α - hydroxyethyl-[2-(p-chlorobenzamido)-5-methoxy]-cinnamic acid in the above example, there is obtained the corresponding 5-dimethylamino-3-indolinylidene acetic acid compound.

Example 4.—1-p-chlorobenzoyl-2-methyl-5-methoxy-3-indole-acetic acid

To a solution of 0.5 g. phosphoric acid in 20 ml. of acetic acid is added 5 g. of 1-p-chlorobenzoyl-2-methyl-5-methoxy-3-indolinylidene acetic acid and the solution refluxed for 2 hours. After cooling to room temperature 20 ml. of water is added. The precipitated solid is filtered, washed with water and recrystallized from t-butanol to give 1 - p - chlorobenzoyl-2-methyl-5-methoxy-indole-3-acetic acid, M.P. 158–160° C.

Similarly, when N-α-hydroxyethyl-[2-(p - chlorobenzamido)-5-methoxy]-cinnamic acid, in presence of p-toluenesulfonic acid is refluxed for 5 hours, 1-p-chlorobenzoyl-2-methyl-5-methoxy-3-indolyl acetic is obtained.

Similarly, when the corresponding 5-dimethylamino-3-indolinylidene acetic acid or N-α-hydroxyethyl-5-dimethylamino cinnamic acid is used in the above example, there is obtained 1-p-chlorobenzoyl-2-methyl-5-dimethylamino-3-indolyl acetic acid.

Example 5.—2-amino-5-dimethylaminocinnamic acid

A. 2-CHLORO-5-NITRO-BENZALDEHYDE-DIETHYL-ACETAL (II)

20 g. of 2-chloro-5-nitrobenzaldehyde is mixed with 200 ml. of anhydrous ethanol containing 1% hydrochloric acid. After 2 days, the mixture is neutralized with sodium methoxide. The solvent is removed in vacuo and the residue is dissolved in ether, washed with 10% sodium hydrogen sulfite solution, then with sodiumcarbonate solution, dried and concentrated in vacuo to obtain 2-chloro-5-nitro-benzaldehyde-diethyl-acetal.

B. 2-AMINO-5-NITRO-BENZALDEHYDE-DIETHYL-ACETAL (III)

2-chloro-5-nitro-benzaldehyde diethylacetal (15 g.) is added to 100 ml. of liquid anhydrous ammonia in a stainless autoclave and shaken for 24 hours at room temperature. The pressure is released and the excess of ammonia allowed to evaporate. The residue is slurried in water, the solid filtered, washed with water and dried in vacuo to obtain 2-amino-5-nitro-benzaldehyde-diethyl-acetone.

C. 2-ACETYLAMINO-5-NITRO-BENZALDEHYDE-DIETHYL-ACETAL (IV)

25 g. of Compound III is dissolved in 120 ml. of anhydrous pyridine. The solution is cooled to 10° and 10 g. of acetic anhydride is added with cooling. The reaction mixture is aged for 24 hours at 10 to 15° C., then poured into 400 ml. of ice water. The precipitated solid is filtered, washed with water and dried to obtain 2-acetylamino-5-nitrobenzaldehyde-diethyl-acetal.

D. 2-ACETYLAMINO-5-DIMETHYLAMINO-BENZALDEHYDE-DIETHYL-ACETAL (V)

2-acetylamino-5-nitrobenzaldehyde - diethyl-acetal (5.6 g.) is dissolved in 60 ml. of dimethoxyethane. After addition 1.0 g. of 10% Pd/C and 8.5 ml. of 37% formaldehyde solution, the mixture is hydrogenated at 40 lbs./s.i. pressure at room temperature until no more hydrogen is absorbed. The catalyst is filtered off and the filtrate concentrated in vacuo to obtain 2-acetylamino-5-dimethylamino-benzaldehyde-diethylacetal.

E. 2-AMINO-5-DIMETHYLAMINO-BENZALDEHYDE (VI)

Compound V (5.0 g.) is added to 25 ml. of 10% hydrochloric acid and warmed up under nitrogen to 70–80° C. and aged for 1 hour. The solution is cooled and the pH adjusted to 7.5 by addition of NaHCO₃. The precipitated 2-methyl-5-dimethylamino - benzaldehyde is filtered, washed and dried in vacuo.

F. 2-ACETYLAMINO-5-DIMETHYLAMINO CINNAMIC ACID (VIII)

A mixture of 30 g. of 2-amino-5-dimethylamino-benzaldehyde, 15 g. anhydrous sodium acetate and 45 g. of acetic anhydride is heated at 180° C. for 8 hours. The reaction product is extracted with benzene to remove unreacted (VI), then poured into an excess of sodium carbonate solution. The separated aqueous phase is acidified (pH 4.5) with dilute hydrochloric acid. The precipitated 2-acetylamino-5-dimethylamino cinnamic acid is filtered, washed with water and used for the next step.

G. 2-AMINO-5-DIMETHYLAMINO CINNAMIC ACID (VIII)

2-acetylamino-5-dimethylamino cinnamic acid (10 g.) is dissolved in 50 ml. of 10% hydrochloric acid and the solution heated at 80 to 90° C. for 1 hour under nitrogen. The solution is cooled to 5° C. and the pH adjusted to 7.5 by addition of NaHCO₃. The precipitated 2-amino-5-dimethylamino cinnamic acid is filtered, washed with water and dried in vacuo.

Example 6.—1-p-chlorobenzoyl-2-methyl-5-methoxy-3-indolyl acetic acid

To a solution of 33.2 g. of 2-(p-chlorobenzamido)-5-methoxy cinnamic acid in 100 ml. of glacial acetic acid is added 5.0 g. of freshly distilled acetaldehyde and 0.5 g. of 85% phosphoric acid and the reaction mixture stirred at room temperature for two hours. At this point the reaction mixture is then heated between 60–70° C. for an additional two hours. 100 milliliters of water is added and the mixture filtered to yield solid 1-p-chlorobenzoyl-2-methyl-5-methoxy-3-indolyl acetic acid.

Similarly, 1-p-chlorobenzoyl-2-methyl - 5 - dimethylamino-3-indolyl acetic acid is prepared by using 1.1 equivalents phosphoric acid in the above example. The final compound is isolated by adding aqueous sodium hydroxide to the reaction mixture to a pH of 6 and the mixture filtered to yield solid 1-p-chlorobenzoyl - 2 - methyl-5-dimethylamino-3-indolyl acetic acid.

What is claimed is:
1. A process for preparing a 3-indolyl acetic acid compound of the formula

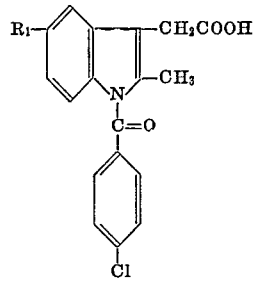

wherein R₁ is methoxy or dimethylamino; which comprises in combination, the steps of
 (a) admixing p-chlorobenzoyl halide or anhydride, in a water soluble base, with 2-amino-5-methoxy (or dimethylamino)-cinnamic acid to form a 2-p-chlorobenzamido cinnamic acid compound;
 (b) admixing said 2-p-chlorobenzamido cinnamic acid compound in an inert solvent at or above room temperature with acetaldehyde in the presence of methane sulfonic acid, p-toluene sulfonic acid or phosphoric acid to form the desired 3-indolyl acetic acid compound; or
 (c) if desired, admixing said 2-p-chlorobenzamido cinnamic acid compound in an inert solvent at or above room temperature with acetaldehyde in the presence of acetic acid, propionic acid or maleic acid to form an N-α-hydroxyethylcinnamic acid compound; and
 (d) admixing said N-α-hydroxyethyl cinnamic acid compound in an inert solvent at or above room temperature with methane sulfonic acid, p-toluene sulfonic acid or phosphoric acid to form the desired 3-indolyl acetic acid compound; or
 (e) if desired, admixing said N-α-hydroxyethyl cinnamic acid compound in an inert solvent with methane sulfonic acid, p-toluene sulfonic acid or phosphoric acid at temperatures between —40° C. and —20° C. to form the corresponding 3-indolinylidene acetic acid compound; and
 (f) admixing said 3-indolinylidene acetic acid compound in an inert solvent at or above room temperature with methane sulfonic acid, p-toluene sulfonic acid or phosphoric acid to form the desired 3-indolyl acetic acid compound.
2. The process of claim 1 wherein R₁ is methoxy.
3. The process of claim 1 wherein R₁ is dimethylamino.

References Cited

UNITED STATES PATENTS 3,161,654   12/1964   Shen _____ 260—326.12

NICHOLAS S. RIZZO, *Primary Examiner.*

J. A. NARCAVAGE, *Assistant Examiner.*